United States Patent
Choi et al.

(10) Patent No.: US 11,842,853 B2
(45) Date of Patent: Dec. 12, 2023

(54) MULTILAYERED ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Hyung Jong Choi, Suwon-si (KR); Yoo Jeong Lee, Suwon-si (KR); Kwan Young Son, Suwon-si (KR); Woo Kyung Sung, Suwon-si (KR); Kyu Sik Park, Suwon-si (KR); Myung Jun Park, Suwon-si (KR); Kwang Yeun Won, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/470,251

(22) Filed: Sep. 9, 2021

(65) Prior Publication Data

US 2022/0199328 A1 Jun. 23, 2022

(30) Foreign Application Priority Data

Dec. 18, 2020 (KR) ........................ 10-2020-0178296

(51) Int. Cl.
*H01G 4/30* (2006.01)
*H01G 4/224* (2006.01)
*H01G 4/248* (2006.01)

(52) U.S. Cl.
CPC ............. *H01G 4/224* (2013.01); *H01G 4/248* (2013.01); *H01G 4/30* (2013.01)

(58) Field of Classification Search
CPC ........... H01G 4/224; H01G 4/248; H01G 4/30
See application file for complete search history.

(56) References Cited

U.S. PATENT DOCUMENTS

| | | | |
|---|---|---|---|
| 9,275,804 B2 | 3/2016 | Nishisaka et al. | |
| 9,390,858 B2 * | 7/2016 | Abe | ...... H01G 13/003 |
| 10,395,840 B1 * | 8/2019 | Park | ...... H01G 2/065 |

(Continued)

FOREIGN PATENT DOCUMENTS

| | | | |
|---|---|---|---|
| CN | 111128545 A * | 5/2020 | ........ B05D 3/0254 |
| JP | 2011-165725 A | 8/2011 | |

(Continued)

OTHER PUBLICATIONS

T. Tateishi, et al., "Effect of La doping on the suppression of insulation resistance degradation in multi-layer ceramic capacitors," The Japan Society of Applied Physics, vol. 58, 2019.

*Primary Examiner* — Dion R. Ferguson
(74) *Attorney, Agent, or Firm* — Morgan, Lewis & Bockius LLP (57) ABSTRACT

A multilayer electronic component according to an embodiment of the present disclosure includes: an electronic component body including a body having a dielectric layer and an internal electrode, and an external electrode disposed on the body; and a coating layer disposed on an external surface of the electronic component body, including one or more of silicon (Si) and fluorine (F), and having an average thickness of 5 nm or more and 15 nm or less.

14 Claims, 9 Drawing Sheets

(56) References Cited

U.S. PATENT DOCUMENTS

| | | | |
|---|---|---|---|
| 11,380,488 B2* | 7/2022 | Kim | H01G 4/012 |
| 2007/0141310 A1* | 6/2007 | Song | B32B 27/304 |
| | | | 428/209 |
| 2008/0151470 A1* | 6/2008 | Motoki | H01G 4/30 |
| | | | 361/303 |
| 2008/0239685 A1* | 10/2008 | Kawabe | H01G 4/33 |
| | | | 361/782 |
| 2010/0302704 A1* | 12/2010 | Ogawa | H01G 4/2325 |
| | | | 361/306.3 |
| 2011/0193448 A1* | 8/2011 | Saruban | H01G 13/00 |
| | | | 336/200 |
| 2011/0287176 A1 | 11/2011 | Saito et al. | |
| 2015/0287532 A1* | 10/2015 | Abe | H05K 3/3436 |
| | | | 427/79 |
| 2016/0042864 A1* | 2/2016 | Hong | H01G 4/30 |
| | | | 361/301.4 |
| 2016/0293330 A1* | 10/2016 | Abe | H05K 1/181 |
| 2019/0103224 A1* | 4/2019 | Han | H01G 4/2325 |
| 2019/0385795 A1* | 12/2019 | Yang | H01G 4/30 |
| 2020/0021265 A1 | 1/2020 | Lee et al. | |
| 2020/0135404 A1* | 4/2020 | Chun | C04B 41/4535 |
| 2021/0233713 A1* | 7/2021 | Nishimura | H01G 4/008 |
| 2022/0208465 A1* | 6/2022 | Lee | H01G 4/1209 |

FOREIGN PATENT DOCUMENTS

| | | | |
|---|---|---|---|
| JP | 2019220677 A * | 12/2019 | H01G 2/12 |
| KR | 10-1200686 B1 | 11/2012 | |
| KR | 10-2016-0016385 A | 2/2016 | |
| KR | 10-1594055 B1 | 2/2016 | |
| KR | 20160069816 A * | 6/2016 | |
| KR | 10-2020-0007545 A | 1/2020 | |
| WO | WO-2021220976 A1 * | 11/2021 | |

* cited by examiner

MULTILAYERED ELECTRONIC COMPONENT AND METHOD OF MANUFACTURING THE SAME

CROSS-REFERENCE TO RELATED APPLICATION(S)

This application claims benefit of priority to Korean Patent Application No. 10-2020-0178296 filed on Dec. 18, 2020, in the Korean Intellectual Property Office, the disclosure of which is incorporated herein by reference in its entirety.

TECHNICAL FIELD

The present disclosure relates to a multilayer electronic component and a method of manufacturing the same.

BACKGROUND

A multilayer ceramic capacitor (MLCC), a type of multilayer electronic component, is a chip type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

The multilayer ceramic capacitor may be used as a component of various electronic devices due to advantages thereof, such as miniaturization, high capacitance, and ease of mounting. As electronic devices such as computers and mobile devices are miniaturized and implemented with high output, demand for miniaturization and implementation of high capacitance in a multilayer ceramic capacitor are increasing.

In addition, as the industry has recently increased interest in automotive electronic components, multilayer ceramic capacitors are also required to have high reliability characteristics in order to be used in automobiles or infotainment systems.

In the multilayer ceramic capacitor, reliability may be deteriorated as moisture penetrates through the boundary between the cover portion or the margin portion and the internal electrode, through pores in the body, and the interface between the external electrode and the body.

In particular, in a high temperature, high humidity and/or high voltage environment, the possibility of deterioration of reliability due to moisture penetration increases. In addition, as the thickness of the external electrodes, the cover portion, and the margin portion gradually becomes thinner in order to meet the demands for miniaturization and high capacitance of the multilayer ceramic capacitor, it is difficult to control physical defects, thereby increasing the possibility of deteriorating reliability.

SUMMARY

An aspect of the present disclosure is to provide a multilayer electronic component having improved reliability.

An aspect of the present disclosure is to provide a multilayer electronic component having excellent mounting characteristics.

According to an aspect of the present disclosure, a multilayer electronic component includes: an electronic component body including a body having a dielectric layer and an internal electrode, and an external electrode disposed on the body; and a coating layer disposed on an external surface of the electronic component body, and containing one or more of silicon (Si) and fluorine (F).

According to another aspect of the present disclosure, a method of manufacturing a multilayer electronic component, includes operations of: immersing an electronic component body including a body having a dielectric layer and an internal electrode, and an external electrode disposed on the body in a solution containing one or more of silane-based and fluorine-based compounds; washing the immersed electronic component body; and drying and curing the washed electronic component body.

According to another aspect of the present disclosure, a multilayer electronic component includes: an electronic component body including a body having a dielectric layer and an internal electrode, and an external electrode disposed on the body; and a coating layer covering the body and the external electrode and having an average thickness of 5 nm or more and 15 nm or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, a first direction may be defined as a stacking direction or a thickness (T) direction, a second direction may be defined as a length (L) direction, and a third direction may be defined as a width (W) direction.

Figure 1:
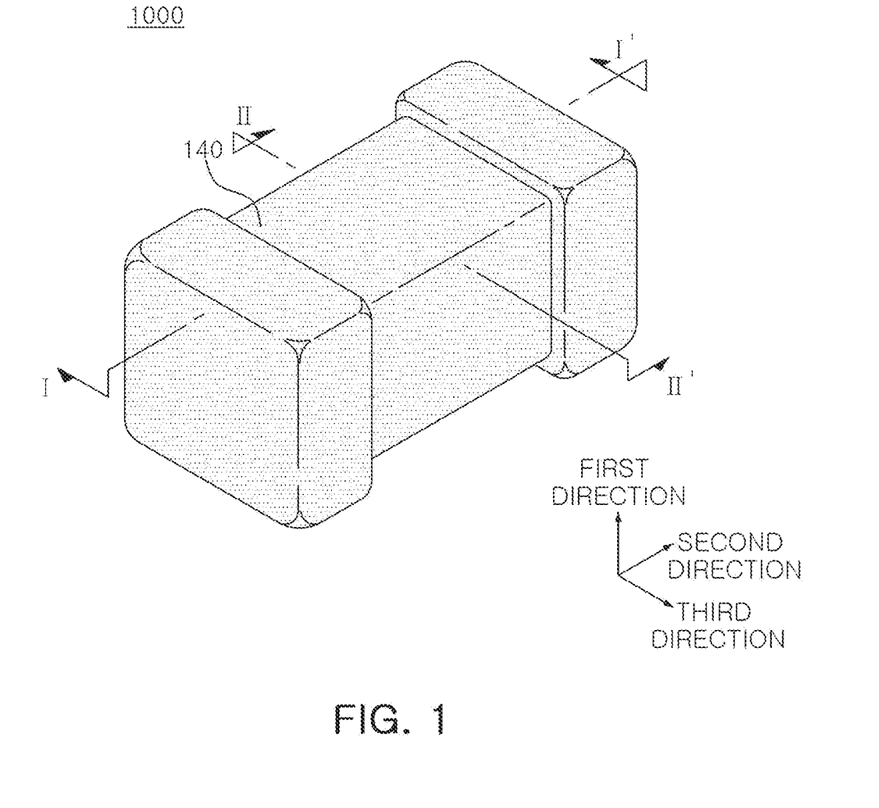
FIG. 1 schematically illustrates a perspective view of a multilayer electronic component according to an embodiment of the present disclosure.

FIG. 1 schematically illustrates a perspective view of a multilayer electronic component according to an embodiment of the present disclosure.

Figure 2:
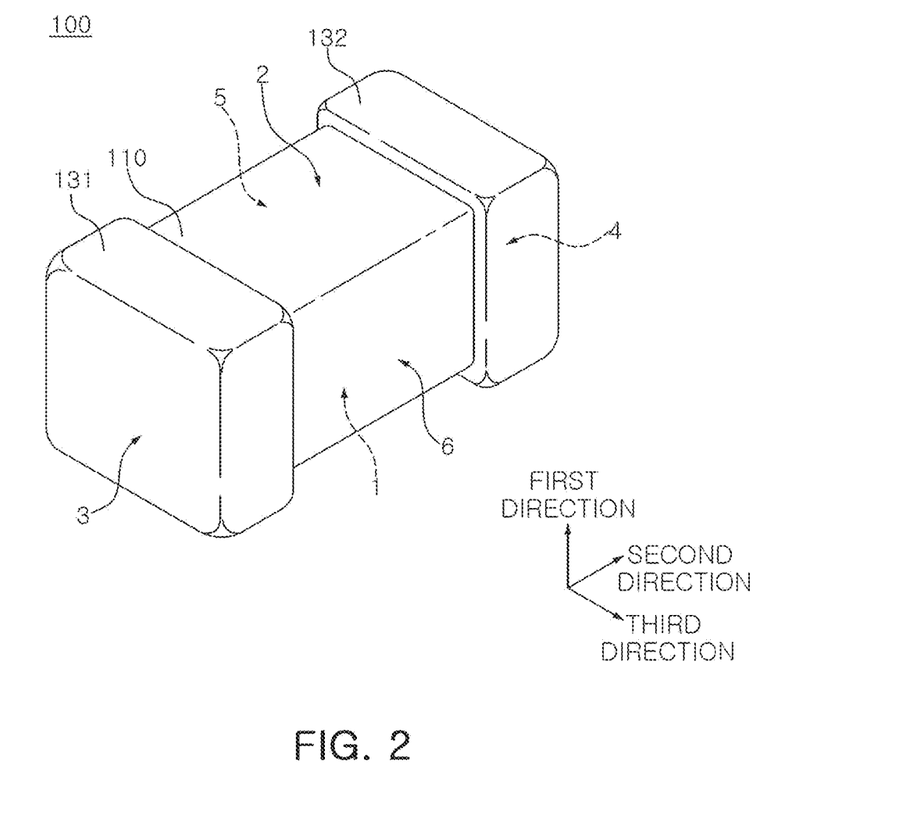
FIG. 2 schematically illustrates a perspective view of an electronic component body except for a coating layer in FIG. 1.

FIG. 2 schematically illustrates a perspective view of an electronic component body except for a coating layer in FIG. 1.

Figure 3:
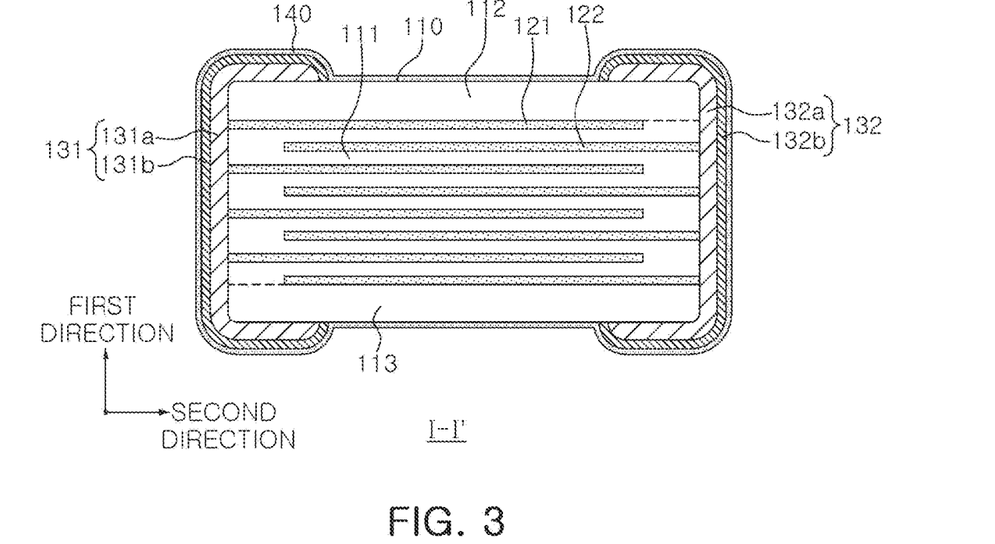
FIG. 3 is a cross-sectional view taken along line I-I' of FIG. 1.

FIG. 3 is a cross-sectional view taken along line I-I' of FIG. 1.

Figure 4:
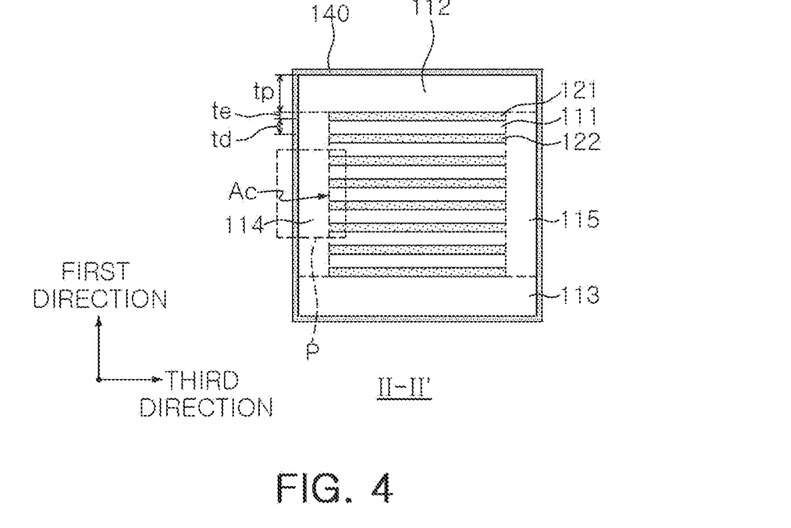
FIG. 4 is a cross-sectional view taken along line II-II' of FIG. 1.

FIG. 4 is a cross-sectional view taken along line II-II' of FIG. 1.

Figure 5:
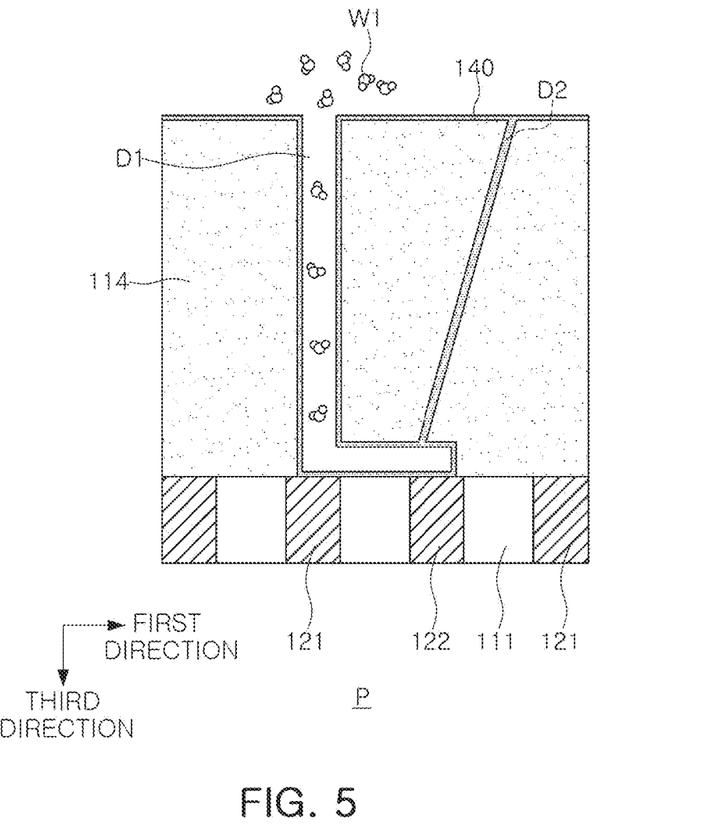
FIG. 5 is an enlarged view of area P of FIG. 4.

FIG. 5 is an enlarged view of area P of FIG. 4.

Hereinafter, a multilayer electronic component 1000 according to an embodiment will be described with reference to FIGS. 1 to 5.

According to an embodiment of the present disclosure, a multilayer electronic component 1000 includes an electronic component body 100 including a body 110 having a dielectric layer 111 and internal electrodes 121 and 122, and external electrodes disposed on the body 110; and a coating layer 140 disposed on an external surface of the electronic component body, including one or more of silicon (Si) and fluorine (F), and having an average thickness of 5 nm or more and 15 nm or less.

The body 110 is formed by alternately stacking a dielectric layer 111 and internal electrodes 121 and 122.

The specific shape of the body 110 is not particularly limited, but as illustrated, the body 110 may have a hexahedral shape, or a shape similar thereto. Due to shrinkage of ceramic powder particles included in the body 110 during a sintering process, the body 110 may have a substantially hexahedral shape, but may not have a hexahedral shape having completely straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

A plurality of dielectric layers 111 forming the body 110 may be in a sintered state, and boundaries between adjacent dielectric layers 111 may be integrated to such an extent that it is difficult to identify the device without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used.

The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, and the like.

In addition, as a raw material for forming the dielectric layer 111, various ceramic additives, organic solvents, plasticizers, binders, dispersants, or the like may be added to powder particles such as barium titanate ($BaTiO_3$) according to the purpose of the present disclosure.

Meanwhile, a thickness td of the dielectric layer 111 is not particularly limited.

However, in general, when the dielectric layer is formed to have a thickness of less than 0.6 µm, in particular, when the thickness of the dielectric layer is 0.5 µm or less, there is a concern that reliability may be deteriorated.

As described below, according to an embodiment of the present disclosure, since it is possible to increase moisture resistance reliability by disposing a coating layer 140 on an external surface of the electronic component body 100, even when the thickness td of the dielectric layer 111 is 0.5 µm or less, sufficient reliability can be secured.

Therefore, when the thickness of the dielectric layer 111 is 0.5 µm or less, an effect of improving reliability according to the present disclosure may be remarkably improved.

The thickness td of the dielectric layer 111 may mean an average thickness of the dielectric layer 111 disposed between the first and second internal electrodes 121 and 122.

The average thickness of the dielectric layer 111 may be measured by scanning an image of a cross-section of the body in length and thickness directions (L-T directions) with a scanning electron microscope (SEM). For example, for an arbitrary dielectric layer extracted from an image obtained by scanning the cross-section in first and second directions (L-T directions) cut in the central portion of the body 110 in a third direction (width direction), with a scanning electron microscope (SEM), an average value can be measured by measuring the thickness thereof at 30 equally spaced points in the length direction.

The thickness measured at the 30 points having equal intervals may be measured at a capacitance formation portion Ac, meaning a region in which the internal electrodes 121 and 122 overlap each other.

A thickness of another element such as a thickness of an internal electrode and a thickness of a coating layer may be defined and measured in a similar manner. In one example, the thickness of the coating layer may be measured by another tool such as a transmission electron microscope (TEM). Other methods and/or tools appreciated by one of ordinary skill in the art, even if not described in the present disclosure, may also be used.

The body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed above and below the capacitance formation portion Ac in the first direction.

In addition, the capacitance formation portion Ac is a portion serving to contribute to capacitance formation of the capacitor, and may be formed by repeatedly laminating a plurality of first and second internal electrodes 121 and 122 with a dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover position 113 may include a ceramic material, for example, a barium titanate ($BaTiO_3$)-based ceramic material.

Meanwhile, the thickness of the cover portions 112 and 113 need not be particularly limited. However, the thickness tp of the cover portions 112 and 113 may be 20 μm or less in order to more easily achieve miniaturization and high capacitance of the multilayer electronic component.

In addition, margin portions 114 and 115 may be respectively disposed on side surfaces of the capacitance formation portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the body 110 in a width direction.

The margin portions 114 and 115 may mean regions between an interface of both ends of the first and second internal electrodes 121 and 122 and the body 110 cut in a cross-section of the body 110 in a width-thickness (first-third) direction, as shown in FIG. 4.

The margin portions 114 and 115 may basically serve to prevent damages to the internal electrodes due to physical or chemical stresses.

The margin portions 114 and 115 may be formed by applying a conductive paste to the ceramic green sheet, except where margin portions are to be formed, to form an internal electrode.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in the third direction (width direction).

The internal electrodes 121 and 122 may be alternately disposed with the dielectric layer 111.

The internal electrodes 121 and 122 may include first and second internal electrodes 121 and 122. The first and second internal electrodes 121 and 122 may be alternately disposed to oppose each other with the dielectric layer 111 constituting the body 110 interposed therebetween, and may be exposed to the third and fourth surfaces 3 and 4 of the body 110, respectively.

Referring to FIGS. 2 and 3, the first internal electrode 121 may be spaced apart from the fourth surface 4 and exposed through the third surface 3, and the second internal electrode 122 may be spaced apart from the third surface 3 and exposed through the fourth surface 4. A first external electrode 131 may be disposed on the third surface 3 of the body and connected to the first internal electrode 121, and a second external electrode 132 may be disposed on the fourth surface 4 of the body and connected to the second internal electrode 122.

That is, the first internal electrode 121 may not be connected to the first external electrode 132 and connected to the first external electrode 131, and the second internal electrode 122 may not be connected to the first external electrode 131 and connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by a dielectric layer 111 disposed in the middle.

The body 110 may be formed by alternately laminating a ceramic green sheet on which the first internal electrode 121 is printed and a ceramic green sheet on which the second internal electrode 122 is printed, and then sintering.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof to a ceramic green sheet. As a printing method of the conductive paste for internal electrodes, a screen printing method or a gravure printing method may be used, but the present disclosure is not limited thereto.

Meanwhile, a thickness te of the internal electrodes 121 and 122 does not need to be particularly limited.

However, in general, when the internal electrodes 121 and 122 are formed to have a thickness of less than 0.6 μm, in particular, when the thickness (te) of the internal electrodes 121 and 122 is 0.5 μm or less, there is a concern that reliability may be deteriorated.

As described below, according to an embodiment of the present disclosure, since moisture resistance reliability may be improved by disposing a coating layer 140 on an external surface of the electronic component body 100, even when the thickness (te) of the internal electrodes 121 and 122 is 0.5 μm or less, sufficient reliability can be secured.

Accordingly, when the thickness (te) of the internal electrodes 121 and 122 is 0.5 μm or less, an effect according to the present disclosure may be more remarkably improved, and miniaturization and high capacitance of the capacitor component may be more easily achieved.

External electrodes 131 and 132 may be disposed on the third surface 3 and the fourth surface 4 of the body 110.

The external electrodes 131 and 132 may be respectively disposed on the third and fourth surfaces 3 and 4 of the body 110, and may include first and second external electrodes 131 and 132 respectively connected to the first and second internal electrodes 121 and 122.

In the present embodiment, a structure in which the multilayer electronic component 100 has two external electrodes 131 and 132 is described, but the number or shape of the external electrodes 131 and 132 may be changed depending on the shape or any other purposes of the internal electrodes 121 and 122.

Meanwhile, the external electrodes 131 and 132 may be formed using any material as long as they have electrical conductivity such as metal, or the like, and a specific material may be determined in consideration of electrical characteristics and structural stability, and further, may have a multilayer structure.

For example, the external electrodes 131 and 132 may include electrode layers 131a and 132a disposed on the body 110 and plating layers 131b and 132b formed on the electrode layers 131a and 132a.

For a more specific example of the electrode layers 131a and 132a, the electrode layers 131a and 132a may be sintered electrodes including conductive metal and glass, or resin-based electrodes including conductive metal and a resin.

In addition, the electrode layers 131a and 132a may have a form in which a sintered electrode and a resin-based electrode are sequentially formed on a body. In addition, the electrode layers 131a and 132a may be formed by transferring a sheet including conductive metal onto a body, or by transferring a sheet including conductive metal onto a sintered electrode.

A material having excellent electrical conductivity may be used as a conductive metal included in the electrode layers 131a and 132a, and the material is not particularly limited. For example, the conductive metal may be one or more of nickel (Ni), copper (Cu), and alloys thereof.

The plating layers 131b and 132b serve to improve mounting characteristics. The type of the plating layers 131b and 132b is not particularly limited, and may be plating layers including one or more of Ni, Sn, Pd, and alloys thereof, and may be formed of a plurality of layers.

For a more specific example of the plating layers 131b and 132b, the plating layers 131b and 132b may be Ni plating layers or Sn plating layers, and may have a form in which Ni plating layers and Sn plating layers are sequentially formed on the electrode layers 131a and 132a, and Sn plating layers, and Ni plating layers and Sn plating layers are sequentially formed. In addition, the plating layers 131b and 132b may also include a plurality of Ni plating layers and/or a plurality of Sn plating layers.

The coating layer 140 may be disposed on the external surface of the electronic component body, may include one or more of silicon (Si) and fluorine (F), and may have an average thickness of 5 nm or more and 15 nm or less.

In the multilayer ceramic capacitor, reliability may be deteriorated as moisture penetrates through a boundary between the cover portion or the margin portion and the internal electrode, through pores in the body, and an interface between the external electrode and the body. In particular, the possibility of deterioration of reliability due to moisture penetration may increase under a high temperature, high humidity and/or high voltage environment.

In addition, as the thickness of the external electrode, the cover portion, and the margin portion gradually becomes thinner in order to meet the demands for miniaturization and high capacitance of the multilayer ceramic capacitor, it is difficult to control physical defects, thereby increasing the possibility of deteriorating reliability.

In order to solve this problem, a method of improving reliability under high temperature, high humidity and/or high voltage environments by controlling a dielectric composition has been proposed, but this method has a disadvantage in that it does not prevent the reliability from deteriorating due to the penetration of moisture into the defective portion of the multilayer electronic component.

Accordingly, a method of blocking moisture penetration by disposing a water-repellent coating layer having water-repellent properties on the surface of the body has been proposed. However, since the external electrode is coated as well as the external surface of the body, a problem in which electrical connectivity of the external electrode is deteriorated occurred. In addition, defects such as slipping or non-mounting may occur during a process of reflow soldering to a printed circuit board (PCB) using Sn.

Therefore, conventionally, a method of disposing a coating prevention portion so that the surface of the external electrode is not coated before coating, and removing the coating prevention portion after coating is completed, was used. Alternatively, after being entirely coated on the body and the external electrode, a method of separately removing a portion coated on the external electrode, was used. Accordingly, there is a problem in that productivity may be lowered or manufacturing costs may be increased.

According to an embodiment of the present disclosure, a coating layer 140 is disposed on the external surface of the electronic component body 100, contains one or more of silicon (Si) and fluorine (F), and an average thickness of the coating layer 140 satisfies 5 nm or more and 15 nm or less, so that moisture resistance reliability can be improved, and at the same time, mounting properties can be secured.

Therefore, since a process of preventing the coating layer 140 from being disposed on the external electrodes 131 and 132 or removing the coating layer 140 formed on the external electrodes 131 and 132 is not required, productivity of the electronic component 1000 can be improved and manufacturing cost may be reduced.

In addition, as the coating layer 140 is also disposed on the external surfaces of the external electrodes 131 and 132, a moisture penetration path through the external electrodes 131 and 132 may be blocked, and a moisture penetration path through an interface of the body 110 in end portions of the external electrodes 131 and 132 may also be blocked, so that the moisture resistance reliability can be further improved.

The coating layer 140 may basically seal fine pores or cracks in the body 110 to prevent moisture from penetrating into the body through the external surface of the body. In addition, as the coating layer 140 is also disposed on the external surfaces of the external electrodes 131 and 132, the moisture penetration path through the external electrodes 131 and 132 may be blocked, and the moisture penetration path through an interface of the body 110 in the end portions of the external electrodes 131 and 132 may also be blocked, so that the moisture resistance reliability may further be improved. In this case, the coating layer 140 may be disposed to contact the external surfaces of the external electrodes 131 and 132, and may be disposed to contact a region of the external surface of the body 110 in which the external electrodes 131 and 132 are not disposed.

The coating layer 140 includes one or more of silicon (Si) and fluorine (F), and accordingly, the coating layer 140 may have water-repellent properties. More specifically, the coating layer 140 may include one or more of a silicone-based hydrocarbon compound and a fluorine-based hydrocarbon compound.

An average thickness of the coating layer 140 may be 5 nm or more and 15 nm or less. When the average thickness of the coating layer 140 is less than 5 nm, there is a concern that sufficient water-repellent properties may not be secured, and when the average thickness of the coating layer 140 exceeds 15 nm, there is a concern that mounting properties may be deteriorated. In addition, when the average thickness of the coating layer 140 is 1 μm or more, significantly thick, it is recognized as a foreign material, and appearance defects may occur.

In one embodiment, the body 110 may include a capacitance formation portion Ac in which the dielectric layer 111 and the internal electrodes 121 and 122 are alternately disposed, cover portions 112 and 113 disposed above and below the capacitance formation portion Ac, and margin portions 114 and 115 disposed on both side surfaces of the capacitance formation portion Ac, and one or more of the cover portions and the margin portions may include defect portions D1 and D2 connecting the capacitance formation portion Ac from the external surface of the body 110, and the coating layer 140 may be disposed to extend to the defect portions D1 and D2.

Figure 6:
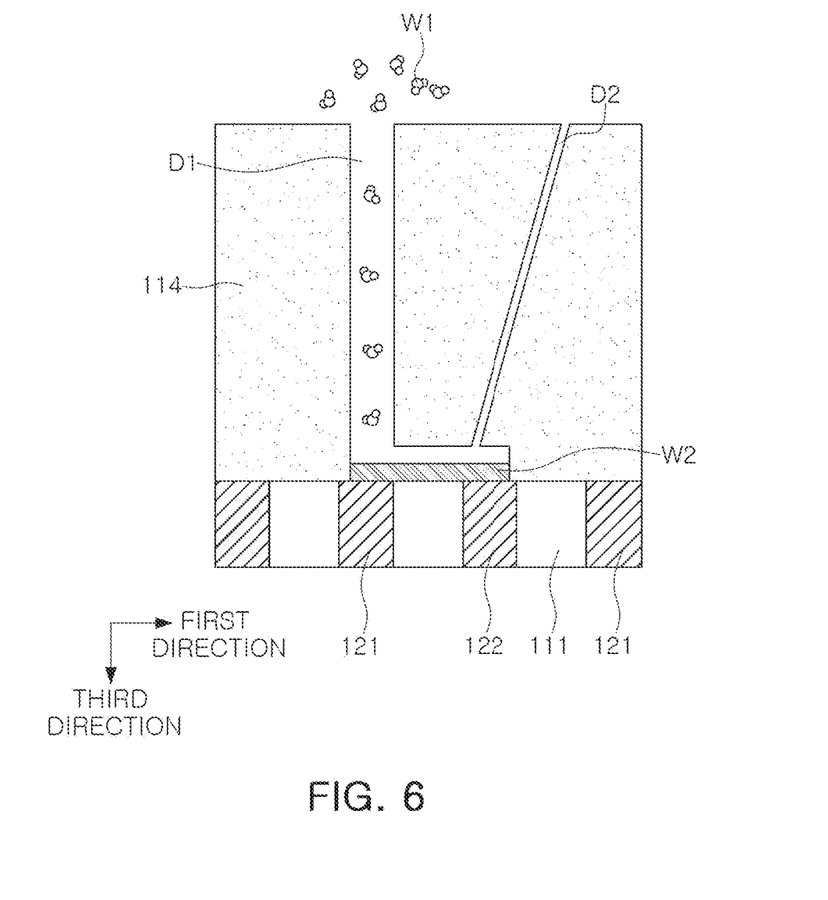
FIG. 6 is an enlarged view of a region corresponding to region P of FIG. 4 of the comparative example in which a coating layer is not included.

FIG. 5 is an enlarged view of area P of FIG. 4. FIG. 6 is an enlarged view of a region corresponding to region P of FIG. 4 of Comparative example in which a coating layer is not included.

Referring to FIG. 6, when there is no coating layer, moisture W1 may penetrate along the defect portions D1 and D2 of the body 110, and the penetrated moisture W1 may form a water layer W2 to cause an electrical short as the first internal electrode 121 and the second internal electrode 122 are connected to each other.

On the other hand, according to the present disclosure, the coating layer 140 is disposed to extend to the defect portions D1 and D2. In the case of the relatively small defect portion D2 such as a relatively small pore, the defect portion D2 may be sealed by the coating layer 140, and in the case of the relatively large defect portion D1 such as a relatively large pore, since the thickness of the coating layer 140 is thin, the coating layer 140 extends along the boundary between the body 110 and the defect portion, so that it may be disposed in a form in which the coating layer 140 surrounds the defect portion.

Accordingly, although moisture W1 may penetrate along the relatively large defect portion D1, a water layer cannot be formed, thereby preventing an electrical short.

Figure 7:
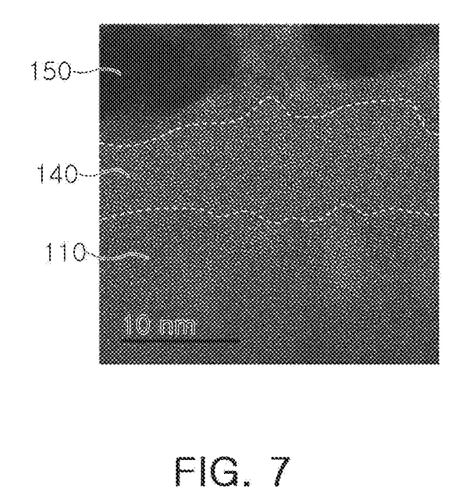
FIG. 7 is an image captured by a transmission electron microscope (TEM) of a cross-section of a coating layer disposed on an external surface of a body according to an embodiment of the present disclosure.

FIG. 7 is a image captured by a transmission electron microscope (TEM) of a cross-section of the coating layer 140 disposed on the external surface of the body 110 according to an embodiment of the present disclosure. It can be seen that the body 110 has a crystalline structure, but the coating layer 140 has an amorphous property.

Figure 8:
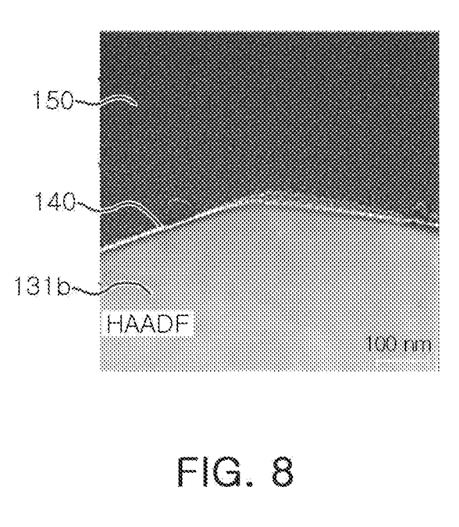
FIG. 8 is an image captured by a transmission electron microscope (TEM) of a cross-section of a coating layer disposed on an external surface of a plating layer according to an embodiment of the present disclosure.
Figure 9:
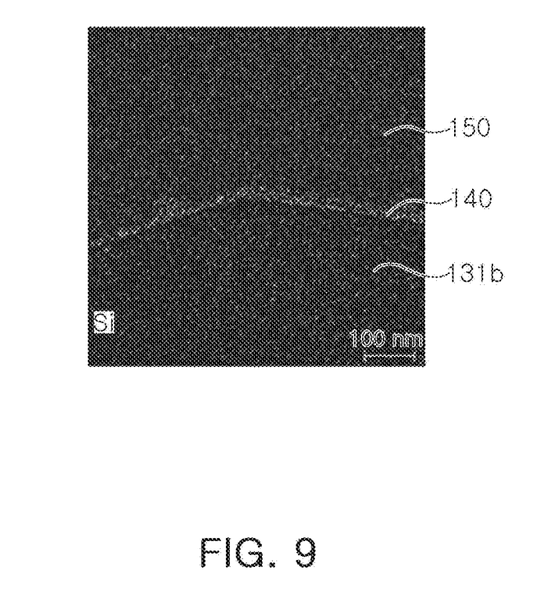
FIG. 9 is a photograph of analyzing a Si component through TEM-EDS for a region corresponding to FIG. 8.

FIG. 8 is an image captured by a transmission electron microscope (TEM) of a cross-section of the coating layer 140 disposed on the external surface of the plating layer 131b according to an embodiment of the present disclosure. FIG. 9 is a photograph of analyzing a Si component through TEM-EDS for a region corresponding to FIGS. 8 and 9, it can be seen that the coating layer 140 is also disposed on the external electrodes 131 and 132.

Meanwhile, in FIGS. 7 to 9, the protective layer 150 for a connected ion beam is a configuration necessary for preparing a transmission electron microscope (TEM) specimen, and is not a configuration of a multilayer electronic component. One of ordinary skill in the art would appreciate that to measure a multilayer electronic component by TEM, a protective layer may be formed on the multilayer electronic component prior to measuring.

In one embodiment, a maximum thickness of the coating layer 140 may be 20 nm or less. When the maximum thickness of the coating layer 140 exceeds 20 nm, the coating layer may be unevenly disposed, and there is a concern that defects such as distorted mounting when mounting a multilayer electronic component on a substrate, defects being distorted after reflow heat treatment.

In one embodiment, a contact angle of the coating layer 140 with water may be 100 degrees or more. When the contact angle of the coating layer 140 with water is 100 degrees or less, the water repellent properties may be insufficient, so that moisture resistance reliability may be deteriorated.

In this case, the contact angle of the coating layer 140 with respect to water may be measured with respect to the coating layer 140 disposed on the external surface of the body 110, and may be measured by using a contact angle measuring device in a 1.0 cm×1.0 cm region.

As the size of the multilayer electronic component 1000 decreases, since, as the thickness of the external electrode, the cover portion, and the margin portion gradually decreases, it may become difficult to control physical defects, thereby increasing the possibility of deteriorating reliability, as the size of the multilayer electronic component 1000 is reduced, the effect of improving the moisture resistance reliability according to the coating layer 140 of the present disclosure may be remarkably improved. In the multilayer electronic component 1000 having a size of 1005 (length×width, 1.0 mm×0.5 mm) or less, the effect of improving moisture resistance reliability, according to the present disclosure, may be remarkably improved, and in particular, in the multilayer electronic component 1000 having a size of 0402 (length×width, 0.4 mm×0.2 mm) or less, the effect of improving the moisture resistance reliability according to the present disclosure may be remarkably improved.

Accordingly, when a size of the multilayer electronic component 100 in the second direction may be 1.1 mm or less, and a size thereof in the third direction may be 0.55 mm or less, considering manufacturing errors and sizes of external electrodes, and more preferably, the size of the multilayer electronic component 100 in the second direction may be 0.44 mm or less, and the size thereof in the third direction may be 0.22 mm or less. In this case, the size of the multilayer electronic component in the second direction may refer to a maximum length of the multilayer electronic component, and the size of the multilayer electronic component in the third direction may refer to a maximum width of the multilayer electronic component.

Method of Manufacturing a Multilayer Electronic Component

Hereinafter, a method of manufacturing a multilayer electronic component according to another embodiment of the present disclosure will be described in detail. However, in order to avoid redundant descriptions, contents overlapping with the contents described in the multilayer electronic component according to the embodiment of the present disclosure will be omitted.

According to another aspect of the present disclosure, a method of manufacturing a multilayer electronic component includes operations of: immersing an electronic component body 100 including a body 110 having a dielectric layer 111 and internal electrodes 121 and 122, and external electrode 131 and 132 disposed on the body 110 in a solution containing one or more of silane-based and fluorine-based compounds; washing the immersed electronic component body, for example, by water; and forming a coating layer 140 including one or more of silicon (Si) and fluorine (F) on an external surface of the electronic component body 100 by drying and curing the washed electronic component body 100 and having an average thickness of 5 nm or more and 15 nm or less.

As a method in which the electronic component body is immersed in a solution containing one or more of a silane-based compound and a fluorine-based compound, a coating layer 140 may be formed on an external surface of the electronic component body. In addition, the coating layer 140 may be disposed so as to contact the external surfaces of external electrodes 131 and 132 and to contact a region of the external surface of the body 110 in which the external electrodes 131 and 132 are not disposed.

Figure 10:
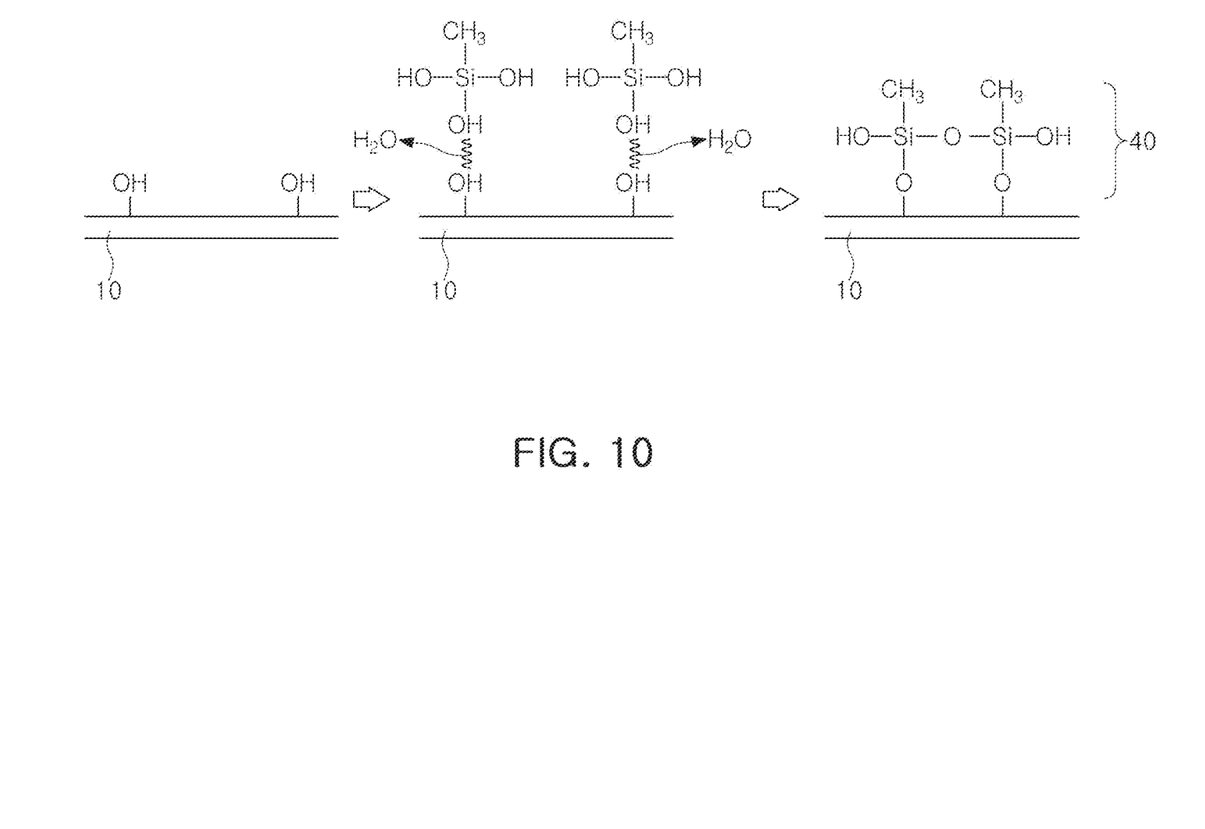
FIG. 10 is a view for explaining a process in which a coating layer is formed.

FIG. 10 is a view for explaining a process in which a coating layer 40 is formed.

Referring to FIG. 10, as the —OH functional group on the substrate 10 and —OH of the silane-based compound are combined, a silane-based compound is adsorbed on a surface of the substrate 10 by a condensation reaction in which $H_2O$ is released, and the silane-based compounds may also be connected through a condensation reaction to form the coating layer 40 on the surface of the substrate 10.

Figure 11:
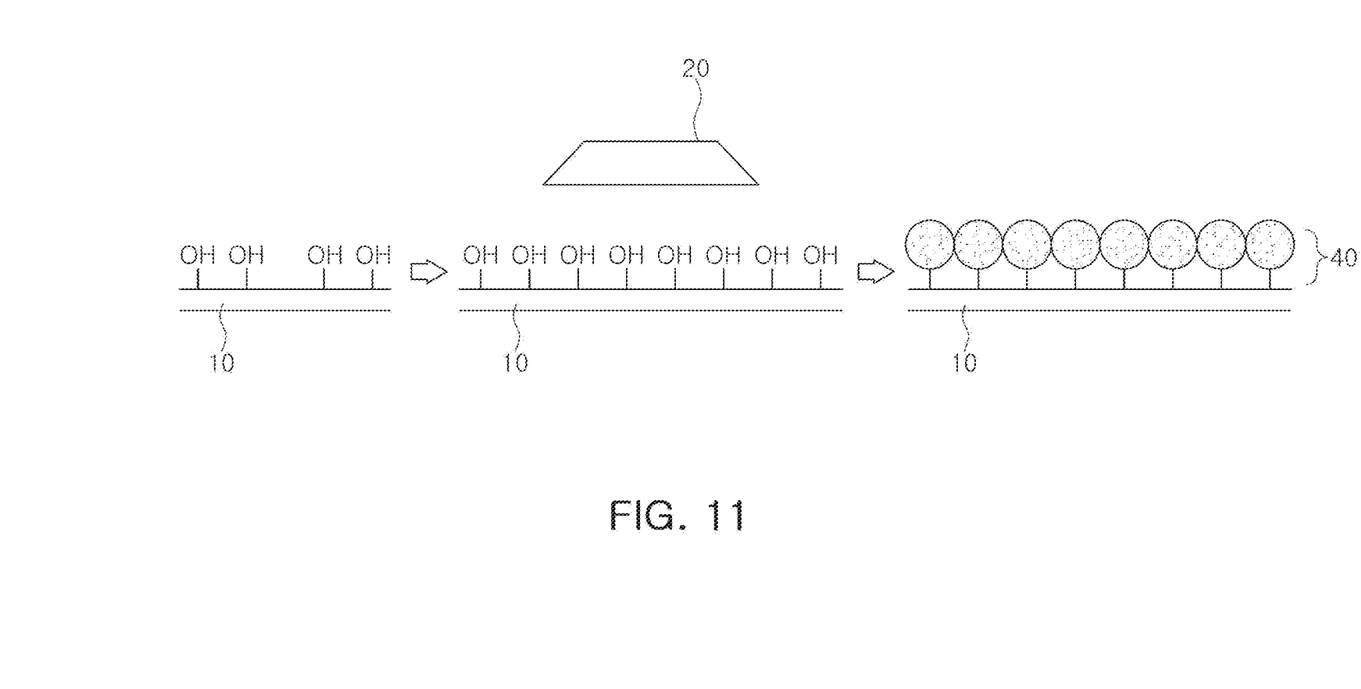
FIG. 11 is a view for explaining a pre-treatment operation.

In one embodiment, before the immersion operation, a pretreatment operation of forming an —OH functional group on the external surface of the electronic component body 100 may be further included.

FIG. 11 is a view for explaining a pre-processing operation. Referring to FIG. 11, before being immersed in a coating solution, $O_2$ plasma may be irradiated on a surface of the substrate 10 with an $O_2$ plasma generator 20 to further impart —OH functional groups. Accordingly, since the coating layer 140 can be formed more densely formed and a coverage can be improved, moisture resistance reliability can be further improved.

Meanwhile, a method of forming an —OH functional group on the external surface of the electronic component body does not need to be particularly limited, and $O_2$ plasma surface treatment, wet-chemical treatment capable of imparting the —OH functional group, and the like, may be used.

Example 1

After preparing a sample chip having the size of Table 1 below, mounting properties and moisture resistance reliability were evaluated according to the presence or absence of a coating layer.

In the sample chip in which a coating layer is formed in Table 1 below, the sample chip was immersed in a solution containing a silane-based compound, followed by washing, drying, and curing to form a coating layer.

In the size of Table 1 below, 0603 means that a length of the sample chip is 0.6 mm and a width is 0.3 mm, and 1005 means that the length of the sample chip is 1.0 mm and the width is 0.5 mm, and 2012 means that the length of the sample chip is 2.0 mm, and the width is 1.2 mm.

Mountability was evaluated by mounting defects and reflow defects. For the mounting defects, after preparing the number of sample chips shown in Table 1 for each test number, the number of sample chips that were mounted in a state in which the sample chip is distorted when mounted on the substrate or unmounted was described.

For reflow defects, after preparing the number of sample chips shown in Table 1 per test number, the number of sample chips that were mounted in a state in which the sample chip is mounted on a substrate and subjected to reflow heat treatment and then a sample chip is distorted or unmounted, was described.

For the moisture resistance reliability, after preparing the number of sample chips shown in Table 1 below for each test number, the number of samples in which an insulation resistance value is lowered to 1/10 or less, compared to an initial value by applying a voltage of 0.7 times a reference voltage (0.7 Vr) for 24 hours or longer, at a temperature of 85° C. and 85% relative humidity, was described.

TABLE 1

| Test Nos. | Presence or absence of coating layer | Size | Mounting defects | Reflow defects | Moisture resistance reliability |
|---|---|---|---|---|---|
| 1 | X | 0603 | 0/4000 | 0/4000 | 62/10700 |
| 2 | ○ | 0603 | 0/4000 | 0/4000 | 69/21300 |
| 3 | X | 1005 | 0/2000 | 0/2000 | 58/8400 |
| 4 | ○ | 1005 | 0/2000 | 0/2000 | 76/21400 |
| 5 | X | 2012 | 0/110 | 0/110 | 41/10800 |
| 6 | ○ | 2012 | 0/110 | 0/110 | 4/8800 |

It can be seen that Test Nos. 2, 4 and 6 have the same mounting properties as Test Nos. 1, 3 and 5 in which a coating layer was not formed even though the coating layer was formed.

It can be seen that a moisture resistance reliability defect rate of Test No. 1 was 0.58%, and the moisture resistance reliability defect rate of Test No. 2 was 0.32%, indicating that the defect rate was significantly reduced.

It can be seen that a moisture resistance reliability defect rate of Test No. 3 was 0.7%, and the moisture resistance reliability defect rate of Test No. 4 was 0.36%, indicating that the defect rate was significantly reduced.

It can be seen that a moisture resistance reliability defect rate of Test No. 5 was 0.38%, and the moisture resistance reliability defect rate of Test No. 6 was 0.045%, indicating that the defect rate was significantly reduced.

Meanwhile, a cross-section of the sample chip of Test No. 4 cut in the first and second directions from the center in the third direction was analyzed by high-resolution transmission electron microscopy (HRTEM) to measure a thickness of a coating layer. In the coating layer disposed on the external surface of the electronic component body, a thickness of 50 points having equal intervals was measured, a minimum value of the 50 points was 4.065 nm, a maximum value was 15.858 nm, which had a value of 20 nm or less, and an average thickness of the coating layer was 9.23 nm.

Example 2

After preparing a sample chip having a length of 1.0 mm and a width of 0.5 mm, moisture resistance reliability was evaluated according to the presence or absence of a coating layer and whether to perform a pretreatment operation.

A thickness of a coating layer was obtained by analyzing a cross-section of a sample chip cut in the first and second directions from the center in the third direction by high-resolution transmission electron microscopy (HRTEM). Specifically, the thickness of 50 point having equal intervals in the coating layer disposed on the external surface of the body was measured, and an average value of a total of 50 points was described.

In Test No. 8, a sample chip was immersed in a solution containing a silane-based compound, followed by washing, drying, and curing to form a coating layer.

In test No. 9, after a pretreatment operation of additionally imparting an —OH functional group to a surface of the sample chip using oxygen plasma, the sample chip was immersed in a solution containing a silane-based compound, followed by washing, drying, and curing to form a coating layer.

For the moisture resistance reliability, after preparing 800 sample chips for each test number, the number of samples in which an insulation resistance value is lowered to 1/10 or less, compared to an initial value by applying a reference voltage (1 Vr) for 24 hours at a temperature of 85° C. and 85% relative humidity, was described.

TABLE 2

| Test No. | Coating layer | Thickness of coating layer(nm) | Pretreatment | Size | Moisture resistance reliability |
|---|---|---|---|---|---|
| 7 | X | — | X | 1005 | 26/800 |
| 8 | ○ | 9.75 | X | 1005 | 22/800 |
| 9 | ○ | 7.53 | ○ | 1005 | 11/800 |

In test Nos. 8 and 9, it can be seen that moisture resistance reliability is improved according to formation of a coating layer. In particular, in the case of Test No. 9 in which a pretreatment operation is performed, a thickness of the coating layer is thinner or equivalent to that of Test No. 8 in which a pretreatment operation is not performed. That is, the density of the coating layer was improved, so that the moisture resistance reliability was remarkably improved.

As set forth above, as one of the various effects of the present disclosure, moisture resistance reliability is improved by disposing a coating layer containing one or more of silicon (Si) and fluorine (F) on an external surface of an electronic component body.

As one of the various effects of the present disclosure, mountability is secured by reducing a thickness of a coating layer containing one or more of silicon (Si) and fluorine (F) on the external surface of the electronic component body.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
   an electronic component body including a body having a dielectric layer and an internal electrode; and an external electrode disposed on the body, and
   a coating layer disposed on an external surface of the electronic component body, and containing one or more of a silicone-based hydrocarbon compound and a fluorine-based hydrocarbon compound, the coating layer having an average thickness of 5 nm or more and 15 nm or less,
   wherein the body comprises a capacitance formation portion in which the dielectric layer and the internal electrode are alternately disposed, a cover portion disposed above and below the capacitance formation portion, and a margin portion disposed on both side surfaces of the capacitance formation portion,
   one or more of the cover portion and the margin portion comprise a pore extending from an external surface of the body towards the capacitance formation portion, and
   the coating layer extends from the external surface of the electronic component body onto a side surface of the pore, while not covering a central portion the pore on a level of the external surface of the electronic component body.

2. The multilayer electronic component of claim 1, wherein the coating layer has a maximum thickness of 20 nm or less.

3. The multilayer electronic component of claim 1, wherein the coating layer has a contact angle of 100 degrees or more with water.

4. The multilayer electronic component of claim 1, wherein the coating layer is disposed to contact an external surface of the external electrode, and is disposed to contact a region of an external surface of the body in which the external electrode is not disposed.

5. The multilayer electronic component of claim 1, wherein the external electrode comprises an electrode layer disposed on the body and a plating layer disposed on the electrode layer.

6. The multilayer electronic component of claim 5, wherein the coating layer is disposed to contact an external surface of the plating layer, and is disposed to contact a region of an external surface of the body in which the external electrode is not disposed.

7. The multilayer electronic component of claim 1,
   wherein coating layer extends along the side surface of the pore to contact the internal electrode in the capacitance formation portion.

8. The multilayer electronic component of claim 1, wherein a thickness of the dielectric layer is 0.5 μm or less.

9. The multilayer electronic component of claim 1, wherein a thickness of the internal electrode is 0.5 μm or less.

10. The multilayer electronic component of claim 1, wherein the coating layer is in contact with the external electrode and the body.

11. The multilayer electronic component of claim 10, wherein the external electrode comprises an electrode layer disposed on the body and a plating layer disposed on the electrode layer, and
    the coating layer covers and is in contact with the plating layer.

12. The multilayer electronic component of claim 1,
    wherein the one or more of the cover portion and the margin portion further comprise another pore, and
    the coating layer seals the another pore.

13. A method of manufacturing a multilayer electronic component, comprising operations of:
    irradiating $O_2$ plasma on an external surface of an electronic component body to form an —OH functional group on the external surface of the electronic component body;
    after irradiating the $O_2$ plasma, immersing the electronic component body including a body having a dielectric layer and an internal electrode, and an external electrode disposed on the body in a solution containing one or more of silane-based and fluorine-based compounds;
    washing the immersed electronic component body; and
    drying and curing the washed electronic component body to form a coating layer on the external surface of the electronic component body, the coating layer containing one or more of silicon (Si) and fluorine (F) and having an average thickness of 5 nm or more and 15 nm or less.

14. The method of manufacturing a multilayer electronic component of claim 13, wherein the coating layer comprises one or more of a silicone-based hydrocarbon compound and a fluorine-based hydrocarbon compound.

* * * * *